(12) United States Patent
Auracher et al.

(10) Patent No.: US 6,539,145 B1
(45) Date of Patent: Mar. 25, 2003

(54) MODULE FOR MULTIPLEXING AND/OR DEMULTIPLEXING OPTICAL SIGNALS

(75) Inventors: Franz Auracher, Baierbrunn (DE); Ingo Baumann, Zorneding (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/699,610

(22) Filed: Oct. 30, 2000

(51) Int. Cl.[7] .............................. G02B 6/28; H04J 14/00
(52) U.S. Cl. .............................. 385/24; 385/17; 385/18; 385/31; 385/33; 359/115; 359/124
(58) Field of Search .............................. 385/24, 17, 18, 385/31, 33; 359/115, 124

(56) References Cited

U.S. PATENT DOCUMENTS

| | | |
|---|---|---|
| 4,813,756 A | 3/1989 | Frenkel et al. |
| 5,287,214 A | 2/1994 | Robertson et al. |
| 5,361,155 A | * 11/1994 | Chiaroni ..................... 359/182 |
| 5,812,291 A | 9/1998 | Bendelli et al. |
| 6,078,710 A | 6/2000 | Li et al. |

* cited by examiner

*Primary Examiner*—Hung Xuan Dang
*Assistant Examiner*—Tuyen Tra
(74) *Attorney, Agent, or Firm*—Laurence A. Greenberg; Werner H. Stemer; Ralph E. Locher

(57) ABSTRACT

The invention relates to a module for multiplexing and/or demultiplexing optical signals, having at least one wavelength-selective filter for multiplexing or demultiplexing into the module optical signals which have been coupled in or out, light beams of at least one optical channel respectively striking a wavelength-selective filter at a specific angle of incidence and, in the process, being separated from the light beams of other optical channels or being combined therewith. According to the invention, at least one wavelength-selective filter (Fi) can be set with reference to the angle of incidence of the light beams. The invention makes available a module in the case of which the center wavelength of a filter can be set precisely on the basis of the adjustability of the angle of incidence and, moreover, a specific filter (Fi) can also be used for several wavelengths.

34 Claims, 9 Drawing Sheets

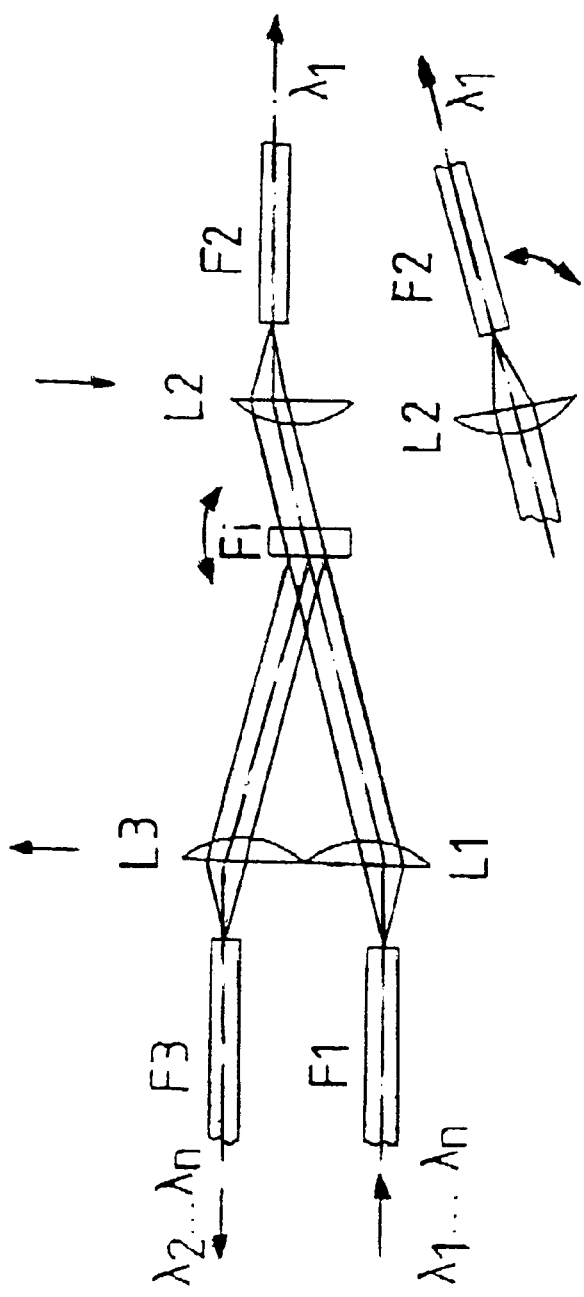
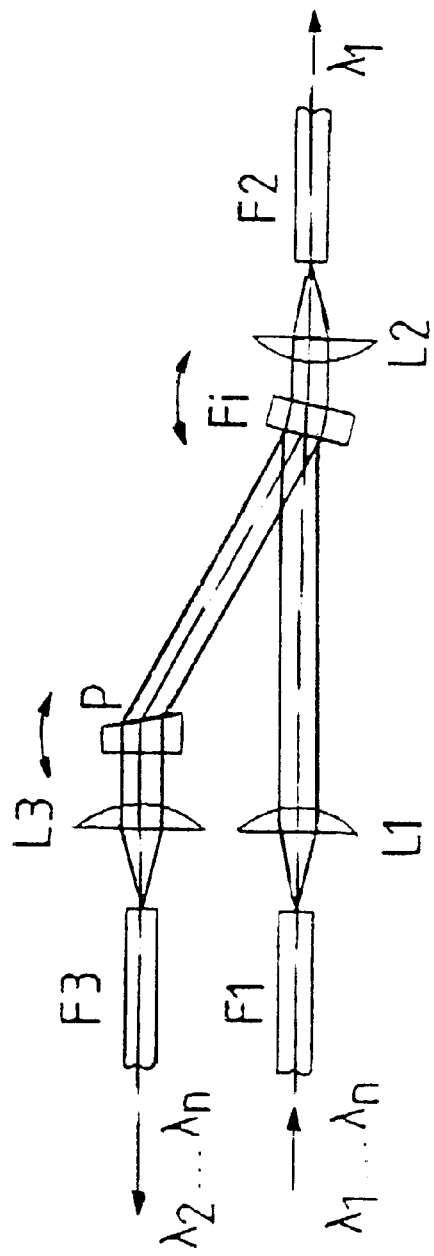
Fig. 1a
Fig. 1b
Fig. 2

PRIOR ART

MODULE FOR MULTIPLEXING AND/OR DEMULTIPLEXING OPTICAL SIGNALS

BACKGROUND OF THE INVENTION

Field of the Invention

Increasing use is being made of wavelength multiplexing/demultiplexing techniques for the purpose of more effective utilization of the transmission capacity of optical conductors. In this case, several mutually independent optical signals of different wavelengths are transmitted over a common optical conductor. Multiplexing/demultiplexing techniques are then used to combine and separate these signals at the receiver and/or transmitter. One possibility for separating and/or combining optical signals of different wavelengths is to use narrowband optical bandpass filters.

Such filters mostly consist of dielectric layer systems which are mounted on suitable carrier substrates, generally glass substrates. Their transmission and/or return characteristics for a specific wavelength region are specifically set by selecting the thicknesses and refractive indices of the individual layers and their arrangement.

The reflectivity and/or transmissivity of optical bandpass filters of different center wavelengths is illustrated schematically and in an idealized fashion in FIG. 9 as a function of the wavelength of the light. In this case, $\lambda 1$ to $\lambda n$ stand for the center wavelengths of the filters F1 to Fn, $\lambda$ stands for the wavelength of the light, and R and T stand for the reflectance and transmittance. The transmittance is illustrated with unbroken lines, and the reflectance with dashed lines. It holds that $R \approx 1-T$. These filters have a particularly high transmission in a specific region about their center wavelength, but reflect light of wavelengths outside this region. They therefore act as wavelength-selective mirrors. The center wavelength is a function in this case of the angle of incidence of the light beams.

A multiplexing/demultiplexing arrangement having optical filters, which is known in the prior art, is illustrated in FIG. 10. The optical signal emerging from an optical conductor F1, as a rule a glass fiber, of wavelengths $\lambda 1-\lambda n$ is collimated by an imaging system L1, rendered parallel and coupled into a filter system. As a rule, the imaging system in this case comprises a lens, mostly a graded-index lens. The filter system comprises optical filters Fi1, Fi2, Fi3, which are fitted at a fixed spacing from one another onto the mutually opposite sides of a plane-parallel glass plate 8 and in a fashion offset relative to one another. The light coupled into the glass plate 8 by the imaging system L1 at a specific angle then runs to and fro inside the glass plate in a zigzag fashion between the mutually opposite filters Fi. Light of a specific wavelength is coupled out of the beam path at each filter Fi and coupled into an optical conductor F2, F3, F4 by the associated imaging system L2, L3, L4.

It is a disadvantage of such arrangements that a special filter of a specific center wavelength must be used respectively for each wavelength. Several different filters are required depending on the wavelength separation and bandwidth of the individual signals to be separated and/or combined, and in this case only very small fault tolerances are permissible in producing the filters. This leads, on the one hand, to an increased rejection of filters for specific wavelengths and thus to increased production costs and, on the other hand, requires high costs for storing individual special filters.

SUMMARY OF THE INVENTION

The object of the present invention is to make available a module for multiplexing and/or demultiplexing optical signals in which there is a reduction in the number of the filters of a different characteristic which are required for a multiplexing/demultiplexing arrangement, and in which it is possible to use filters with higher manufacturing tolerances.

It is provided in accordance therewith that at least one wavelength-selective filter can be set with reference to the angle of incidence of the light beams. The desired center wavelength of the respective filter can be set exactly in this case via the angle of incidence. This has two advantages. Firstly, individual special filters can be used as multiplexing elements for several wavelengths, the selected wavelength being set via the angle of incidence of the light beams. By using identical filters for different wavelength channels, it is possible to reduce the total number of different filters to be produced, and thus to lower the costs of production and storage.

Secondly, it is possible to use filters with higher tolerances with reference to the center wavelength, since the desired center wavelength can be set precisely by appropriately tilting the filter even in the case of high tolerance values. Consequently, the rejection in filter production can be substantially reduced, and costs can be saved correspondingly.

In a preferred refinement of the invention, the light is coupled into or out of the module by means of optical conductors, each optical conductor being assigned at least one imaging element which is arranged between the optical conductor and a filter. In this case, the optical axes of the optical conductors and the optical axes of the imaging elements assigned to the optical conductors are preferably arranged parallel to one another. Both the adjustment and the fixing of the individual components are facilitated in this way by a parallel arrangement.

In a first development of this refinement of the invention, in each case the imaging element is a lens which is transirradiated off-axis by the light of the assigned optical conductor. The beam deflection required for the functioning of the multiplexing/demultiplexing arrangement is achieved in this case by means of a parallel offset of the optical axis of the optical conductor and assigned imaging element. Such an arrangement is of particularly simple design and is therefore also simple in terms of production engineering and can be executed with a low outlay on adjustment. In this case, use is also made in some circumstances of more complicated, multistage lens systems, for example, to reduce imaging errors resulting from the off-axis transirradiation of the lens.

In a second development, in each case the imaging element is a lens which is transirradiated axially by the light of the assigned optical conductor. Imaging errors owing to off-axis transirradiation of the lens are thereby avoided. However, in order to retain the parallelism of the optical axes of the optical conductors there is then additional need for at least one optical element which can be tilted with reference to the angle of incidence of the light beam and deflects light reflected by the filter in the direction of the lens and the assigned optical conductor. The tiltable optical element is, in particular, a mirror or prism arranged in the beam path between the filter and lens. In this case, by comparison with the use of a prism, the use of a mirror has the advantage of avoiding an additional wavelength dependence on the basis of the dispersion of the glass. Mirrors, prisms and also the wavelength-selective filters should have a weak dependence on polarization.

The arrangements described for producing a beam deflection have the advantage that it is possible in a multichannel multiplexing/demultiplexing arrangement having cascades of optical conductors, imaging systems and tiltable filters to avoid the direct adaptation, which is very complicated in terms of production engineering, of the angular settings of the optical axes of the imaging systems and optical conductors to the tilted filter/filters.

Particularly compact designs are provided by arrangements in which either several filter cascades or filter and mirror/prism cascades are combined. The individual filters of a cascade can be filtered either individually or in common in this case. In the cascaded arrangements, the respective optical conductors are preferably arranged parallel to one another in accordance with the above-described beam deflecting arrangements, and can thereby easily be adjusted and fixed.

A first such advantageous arrangement is provided by two, mutually opposite filter cascades. The filters, which can be tilted about the beam axis, of the two cascades are mutually offset in this case, such that the beam path between the filter cascades describes a zigzag line. A specific wavelength is coupled out at each filter element in a wavelength-selective fashion and coupled into the appropriate optical conductor by the imaging system. The optical axis of the imaging system and the axis of the optical conductor are parallel to one another in this case. Beam deflection and the compensation of the tiltability of the filters are preferably achieved by an adjustable parallel offset between the optical axis of each imaging system and the respective optical conductor axis.

A second such advantageous arrangement is provided by the combination of a filter cascade with a mirror cascade. The elements, which can be tilted about the beam axis, of the two cascades are preferably arranged in this case offset relative to one another such that the beam path between the cascades describes a zigzag line. In this case, a specific wavelength is coupled out at each filter element and coupled into the appropriate optical conductor by the imaging system. The optical axis of the imaging system and the optical axis of the optical conductor preferably coincide in this arrangement, in order to avoid additional imaging errors. The required beam deflection and the compensation of the tiltability of the filter elements are achieved by the tiltable mirror elements.

A third advantageous arrangement is provided by the combination of a filter cascade and a mirror cascade, in the case of which the individual filters of a cascade are arranged one behind another. In this arrangement, an individual filter element of a cascade preferably reflects light of only one wavelength, all others being transmitted. The light reflected by a filter is deflected onto an element of the imaging system via a tiltable mirror of the mirror cascade. The optical axes of the imaging system and the optical conductor axis preferably coincide in this case. It is also preferred to provide that the light respectively deflected by a tiltable mirror is coupled out into the filter cascade essentially at right angles to the beam direction, such that the individual optical conductors are in turn arranged parallel to one another.

In a preferred refinement of the invention, all the optical channels are arranged on one side of the component or the filters. For this purpose, the optical channels of the first or the second optical imaging system are coupled into or out of the module via a deflecting prism, if appropriate. The arrangement of the optical channels on only one side of the module has advantages in terms of production engineering.

In an advantageous development of the invention, the filters and, if appropriate, mirrors or prisms are arranged on a flat platform, and this platform is inserted into a housing which has at least one light entry/exit port, the lenses and optical conductors of the first and/or second imaging system being permanently connected to the outside of the housing. In this case, the fastening and adjustment of the imaging systems and/or lens holders and optical fiber holders is preferably performed by means of laser welding technology at the fixed housing. This produces a fastening which is particularly stable in the long-term mechanically.

In particular, the fastening of the lenses/fiber elements is preferably performed by a means of a free active adjustment of the elements in a holder flange or a holder sleeve, and by subsequently welding these-flanges or sleeves to the housing.

BRIEF DESCRIPTION OF THE DRAWINGS

FIG. 1a shows a first arrangement of the optical components of a two-channel multiplexing/demultiplexing module according to the invention;

FIG. 1b shows a second arrangement of the optical components of a two-channel multiplexing/demultiplexing module according to the invention, with lenses and fibers which can be tilted about their axes;

FIG. 2 shows a third arrangement of the optical components of a two-channel multiplexing/demultiplexing module according to the invention, with the use of a deflecting prism;

FIG. 4 shows an exemplary embodiment of a multichannel multiplexing/demultiplexing module according to the invention, having beam deflection in accordance with FIG. 1a;

DESCRIPTION OF THE PREFERRED EMBODIMENT

Figure 3:
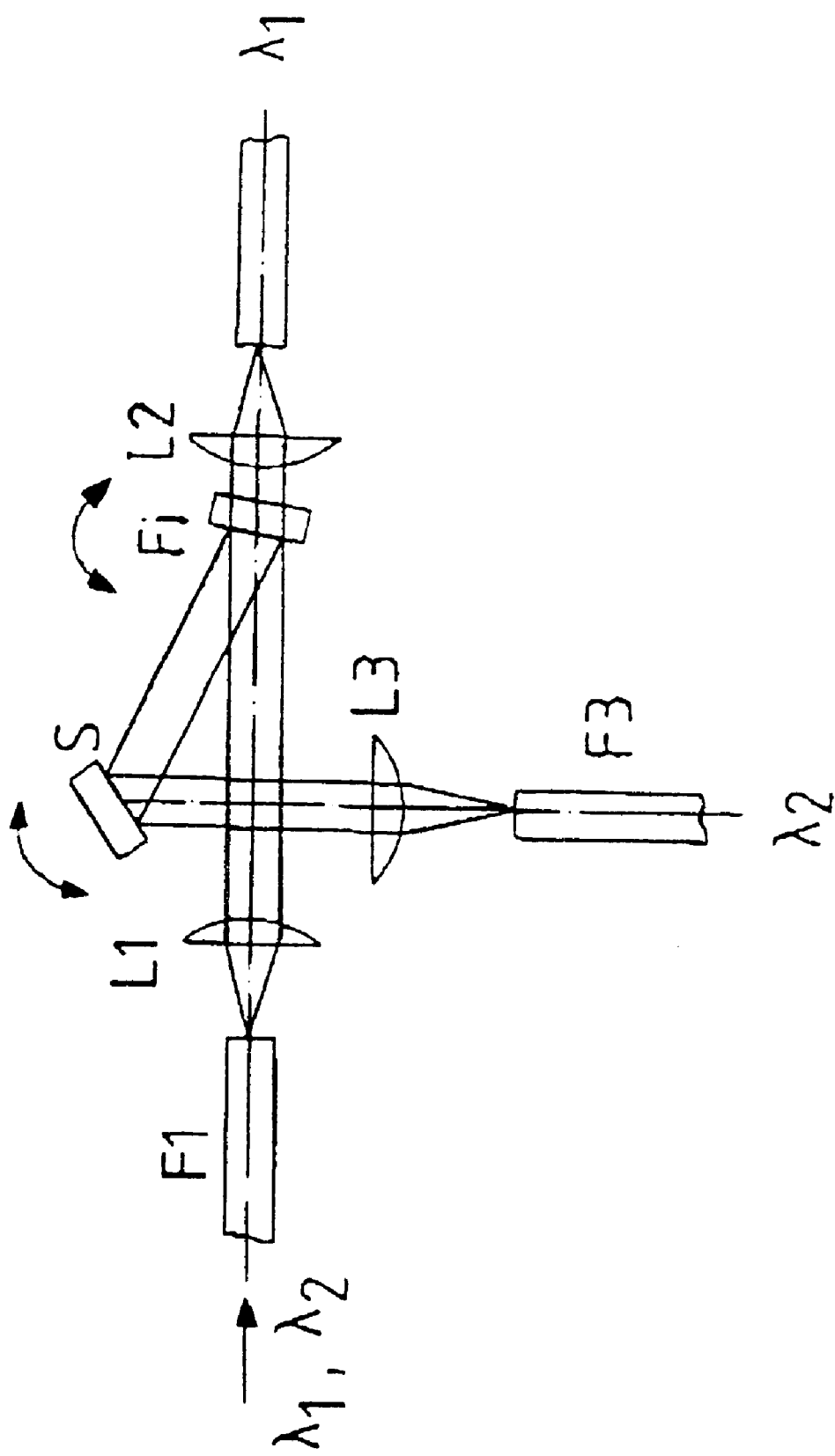
FIG. 3 shows a fourth arrangement of the optical components of a two-channel multiplexing/demultiplexing module according to the invention, with the use of a deflecting mirror.

A first arrangement of the optical components of a two-channel wavelength division multiplexing/demultiplexing module according to the invention is illustrated in FIG. 1a. The module has a first optical conductor F1 with an assigned lens L1 which constitutes an optical imaging system for coupling light beams of the optical conductor F1 into the module. The optical conductor F1 guides light of several wavelengths λ1 to λn which constitute different optical channels.

The coupled-in light is collimated by the lens L1 and ideally imaged as parallel light onto a wavelength-selective filter Fi, which transmits a wavelength λ1 and reflects the remaining wavelengths λ2 to λn, and thereby separates light of wavelength λ1 from the other wavelengths. The filter Fi is tiltably arranged, as is indicated by an arrow. Rotatable holders for the filter Fi are provided, for example, for this purpose. The adjustment can be performed by hand, but can also be automated, for example, by carrying out a computer-monitored active adjustment.

A desired center wavelength which is to be transmitted is set precisely by tilting the filter Fi about the beam axis.

The transmitted or reflected light is imaged by lenses L2, L3 onto the entry port of the optical conductors F2, F3, and relayed by the latter.

In FIG. 1, the optical axes of the lenses L1, L2, L3 are arranged parallel to one another and aligned with the axes of the fibers F1, F2, F3, each lens respectively coupling in or out the beam from a specific fiber. The light of the fiber F1 in this case strikes the lens L1 off-axis, and is therefore deflected by an angle which is a function of the offset of the axes of the fiber F1 and lens L1 relative to the optical axis of the lens. It strikes the filter Fi at an angle which is a function of the tilt position of the filter Fi. As described, the filter Fi transmits only the portion of the light of wavelength λ1. The transmitted light falls in turn off-axis onto the lens L2, is focused by the latter, coupled into the fiber F2 and led off laterally. The light, reflected by the filter Fi, of wavelengths λ2 to λn falls off-axis onto the lens L3, is coupled into the fiber F3 by the latter and likewise led off laterally.

The beam deflection must be compensated given tilting of the filter Fi. This is performed by a further parallel offset of the fiber axes relative to the main axes of the lenses L1, L2 and L3.

An advantage of the parallel arrangement of all the optical axes of fibers and lenses resides in the adjustment and mounting, which are particularly easy and simple to carry out, of the elements, and in the possibility of thereby designing the module more compactly.

The beam path of the light of wavelengths λ1–λn in FIG. 1b is similar to that in FIG. 1a. In this arrangement, however, the optical axes of the lenses L1, L2, L3 and the fiber axes coincide. The required beam deflection and the correction it requires because of the tiltability of the filter are produced by tilting the main lens axes and fiber axes (indicated by an arrow).

The advantage of such an arrangement resides in the avoidance of imaging errors owing to off-axis transirradiation of the lens, such as can occur in an arrangement in accordance with FIG. 1a if no complicated imaging systems are used to avoid such imaging errors.

A further possibility for arranging the optical axes of the imaging systems and optical conductors in parallel while still avoiding additional imaging errors, and for carrying out the compensation of the beam deflection rendered necessary by the tilting of a filter Fi resides in the use of further deflecting elements in the beam path.

The principle governing the use of a deflecting prism in the optical beam path is shown in FIG. 2 using the example of a two-channel demultiplexer. The beam path runs axially from the fiber F1 through the lens L1 to the filter Fi. Light of wavelength λ1 is transmitted through the filter Fi and coupled into the fiber F2 through the lens L2. The beam axis for light of this wavelength coincides with the fiber axes and the main lens axes of the fibers F1 and F2 and the lenses L1 and L2, respectively before and after passage through the filter Fi. A parallel offset of the beam which occurs from the passage through the tiltable filter Fi is compensated by an offset of the lens L2 and fiber F2.

The beam deflection for the beams, reflected by the filter Fi, of wavelengths λ2–λn is compensated by a deflecting prism P which can be tilted about the beam axis. After passage through the prism P, the beam is coupled into the fiber F3 through the lens L3.

The use of a mirror S for beam deflection in the optical beam path is shown in FIG. 3 using the example of a two-channel demultiplexer. The beam path runs axially from the fiber F1 through the lens L1 to the filter Fi. Light of wavelength λ1 is transmitted through the filter Fi and coupled into the fiber F2 through the lens L2. The beam axis for light of this wavelength coincides with the fiber axes and the main lens axes of the fibers F1 and F2 and the lenses L1 and L2, respectively before and after passage through the filter. A parallel offset of the beam which occurs from the passage through the tiltable filter Fi is compensated by an offset of the lens L2 and fiber F2.

A beam deflection for the beams, reflected by the filter Fi, of wavelengths λ2–λn is compensated by a deflecting mirror S which can be tilted about the beam axis. After reflection at the mirror S, the beam is coupled into the fiber F3 through the lens L3. The direction in which the light is coupled out is at right angles in this case to the direction in which it is coupled in. The use of a mirror as beam-deflecting element has the advantage that no further dispersive element occurs in the beam path.

In order to be able to separate more than two wavelengths, or to combine them in the case of reversal of the beam path, several of the arrangements shown in FIGS. 1a, 2 and 3 are designed in a cascade.

Figure 4:
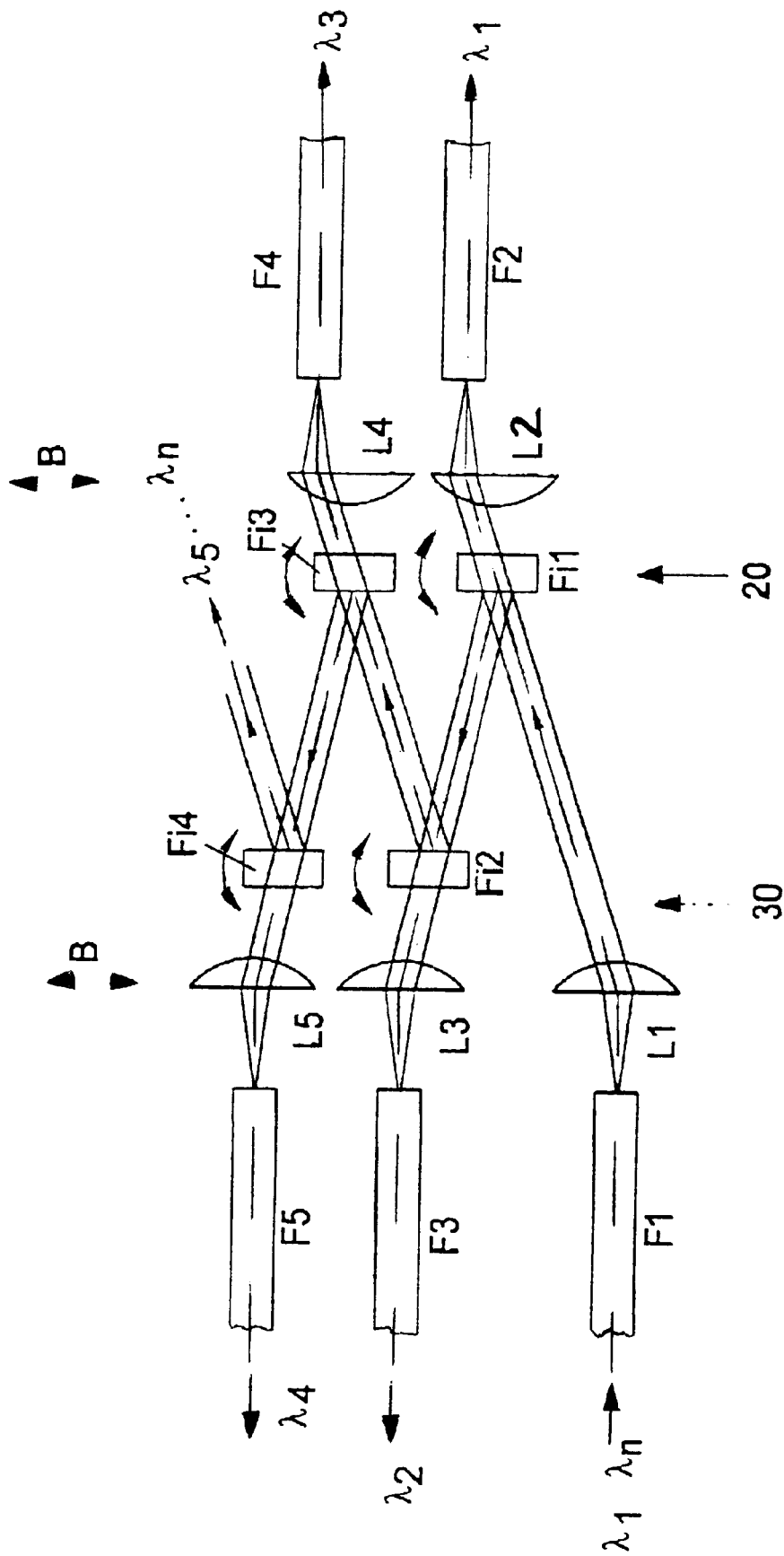

An exemplary embodiment of a multichannel multiplexer and/or demultiplexer exhibiting the beam-deflecting principle illustrated in FIG. 1a is shown by FIG. 4. In the arrangement shown, the fibers F1, F2, F3, F4, F5 are fed from two sides. Their axes are respectively parallel and offset in parallel relative to the optical axes of the coupling-in and coupling-out lenses L1, L2, L3, L4, L5 in such a way as to produce a beam deflection which can be set individually to each of the individual tiltable filters Fi1, Fi2, Fi3, Fi4. The filters Fi1, Fi3 and Fi2, Fi4 are opposite one another offset in two cascades 20, 30. Each of the filters Fi transmits just light of one wavelength, light of all other wavelengths being reflected. This produces a zigzag beam path between the filter cascades 20, 30 after the light of wavelength λ1–λn is coupled in from the fiber F1. The light of one wavelength is coupled out of this beam path at each filter Fi.

It may be pointed out.that each filter Fi of the two cascades 20, 30 can be set individually in order to be able to set the desired center wavelength exactly. In this case, it is preferred to use identical filters for several neighboring wavelengths, something which is possible by appropriate rotation of the filters with reference to the angle of incidence of the collimated beam. As indicated by the double arrow B, the lenses L1 and assigned optical conductors are arranged capable of displacement at right angles to their optical axis in order to compensate the offset occurring upon rotation and/or tilting of a filter.

Figure 5:
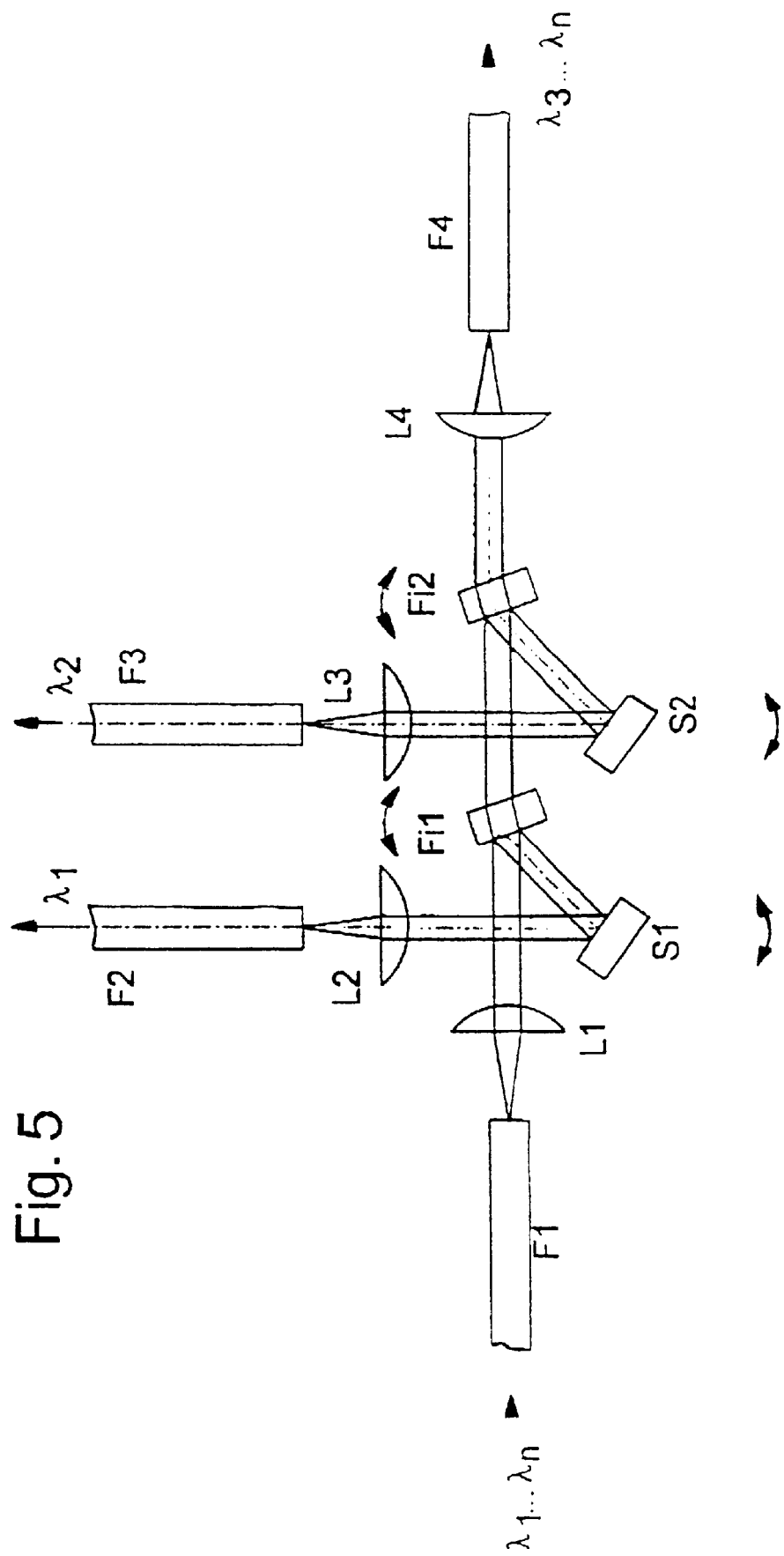
FIG. 5 shows an exemplary embodiment of a multichannel multiplexing/demultiplexing module according to the invention, having beam deflection in accordance with FIG. 3.
Figure 6A:
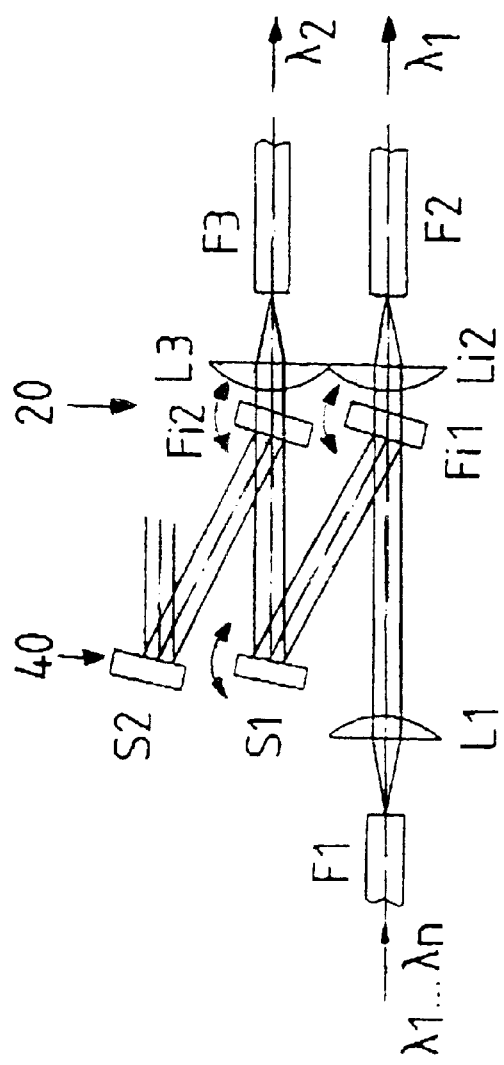
FIG. 6a shows an exemplary embodiment of a multichannel multiplexing/demultiplexing module according to the invention, in which a filter cascade and a mirror cascade are provided.
Figure 6B:
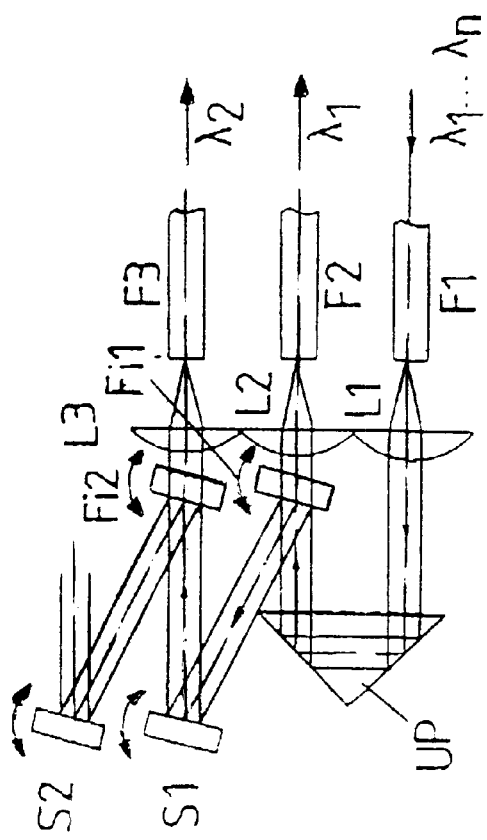
FIG. 6b shows an exemplary embodiment of a multichannel multiplexing/demultiplexing module according to the invention, with a one-sided arrangement of all the fiber and lens elements.

Exemplary embodiments having lenses centered with reference to the collimated beams are illustrated in FIGS. 5, 6a and 6b according to the beam-deflecting principles illustrated FIGS. 2 and 3.

Individually tiltable mirrors S1, S2 are used for beam deflection and for compensating the filter tilting in the case of the exemplary embodiment illustrated in FIG. 5. The beam path is of cruciform design in this case: the light of wavelengths $\lambda 1$ to $\lambda n$ is fed from one side via the fiber F1, the light of wavelengths $\lambda 3$–$\lambda n$ is coupled into the outgoing fiber F4 on the opposite side via the lens F4. The filters Fi1 and Fi2 respectively couple light of wavelengths $\lambda 1$ and $\lambda 2$ out of the beam path by reflection, which light is then coupled into the fibers F2, F3 via the mirrors S1, S2 and the lenses L2, L3, and led off at right angles to the direction in which the light is fed.

The exemplary embodiment illustrated in FIG. 6a likewise shows a design having individually tiltable mirrors for beam deflection and compensation of filter tilting. The beam path is designed in this case such that the outgoing fibers F2, F3 are all situated on one side. The filters Fi1, Fi2 and the mirrors S1, S2 are respectively arranged in a cascade 20, 40. The individual elements are offset relative to one another in this case. The result, after the light of wavelength $\lambda 1$–$\lambda n$ is coupled in from the fiber F1, is a zigzag beam path between the two cascades 20, 40. Light of one wavelength is coupled out of this beam path at each filter, coupled into a fiber through the respective lens and led off laterally.

A modification of the design shown in FIG. 6a is illustrated in FIG. 6b. In this case, the incoming fiber F1 is also on the side of the outgoing fibers F2, F3. The beam deflection required for this purpose is performed by a 90° prism UP. However, pentaprisms or mirrors are also possible.

All the exemplary embodiments shown for the optical design are, of course, not limited to the use of a specific number of incoming or outgoing fibers and the corresponding number of filters, lenses and beam-deflecting elements, but can be designed for an arbitrary number of fibers. It is also within the scope of the invention for the light of the individual wavelengths not to be led off or fed via optical conductors, but for the multiplexer/demultiplexer to be coupled directly to an optoelectronic module which, for example, couples light of the individual wavelengths in or out via a transmitting or receiving array of optoelectronic elements.

It can be provided, moreover, that instead of the optical conductors there are arranged on the module plugs into which the optical conductors are then plugged.

When the module is used as a multiplexing module, it is merely necessary to reverse the beam path in the above-named exemplary embodiments.

The filters Fi and any prismatic and mirror elements are arranged on a flat platform (not illustrated) which is surrounded by a housing. The layout and fastening of the individual filter and mirror/prismatic elements on the platform are performed, for example, by means of bonding, soldering or mounting or welding. As base material for the platform, use is made in this case of, for example, the materials of glass, ceramic, silicon or else metals. The filters, mirrors or prisms either themselves have a sufficiently large, flat supporting surface, or they are mounted on the platform by means of appropriate carriers.

Since the connection of the optical components to the platform has to be particularly stable, the coefficients of thermal expansion of the parts to be connected must be matched to one another as far as possible. In addition, in the case of particularly high demands placed on the wavelength stability, temperature regulation of individual filters, or else of the entire structure, is provided by means of Peltier cooling or a heater. The entire platform is then placed with the housing onto a Peltier cooler or a heater. A temperature sensor, for example an NTC thermistor, is fitted in this case on the platform for the purpose of temperature regulation. Regulation is performed, for example, by means of a P/I controller.

Figure 7:
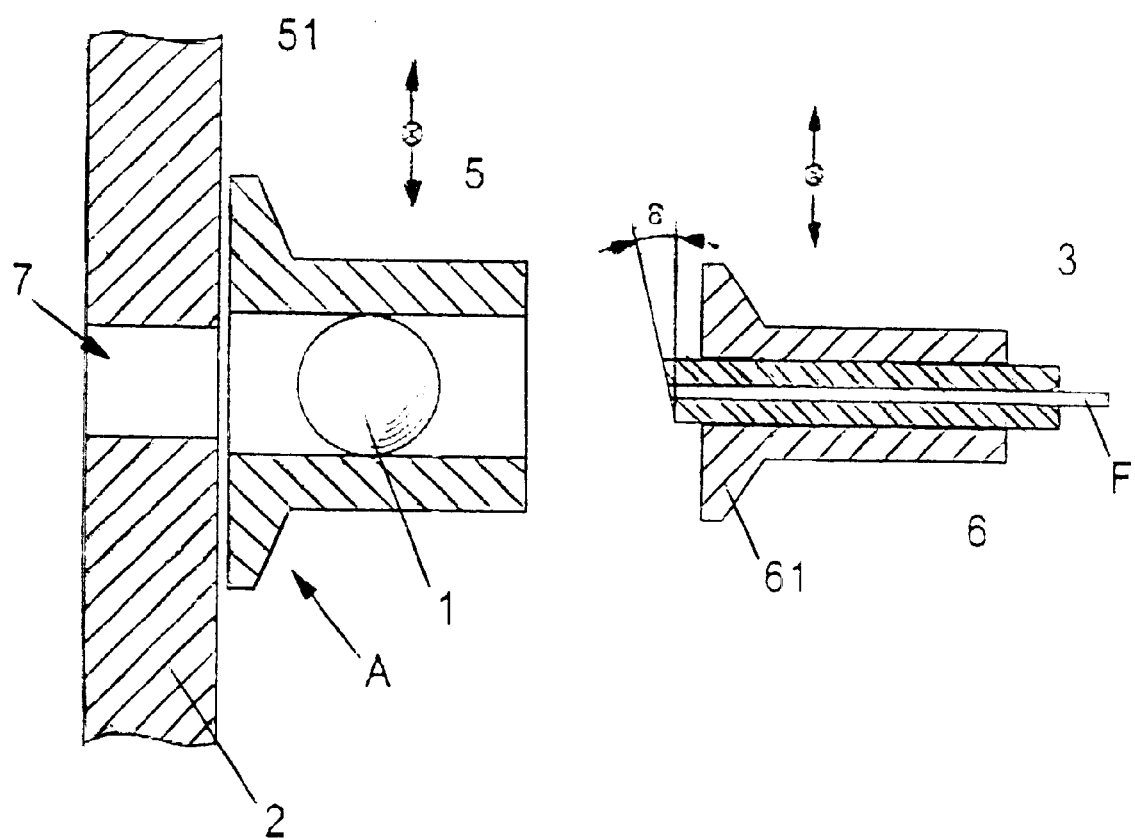
FIG. 7 shows a schematic of the holding, adjustment and fastening of a lens and a glass fiber in a multiplexing/demultiplexing module according to the invention.

Illustrated schematically in FIG. 7 is an exemplary embodiment for holding, adjusting and fastening an optical beam path on a housing 2 which surrounds a platform (not illustrated) with filters and, possibly, prismatic and mirror elements. The housing 2 has light entry/exit ports 7 in this case, via which light is coupled into or out of the housing 2.

A spherical lens 1 and a glass fiber F are fastened on the outer wall of the housing above the light entry/exit port 7. The spherical lens 1 is arranged in a lens flange 5 which is fastened on the housing 2. The flange 5 has a cylindrical bore for holding the spherical lens 1. The spherical lens 1 is inserted into the flange 5, for example, against a depth stop, in such a way that its focus is set with respect to the housing 2. Instead of a spherical lens, it is also possible to insert graded-index lenses or other optics into the lens flange 5.

The glass fiber F is arranged in a capillary 3, in particular being bonded into the same. In this case, the fiber end face is slightly ground obliquely in order to avoid back-reflections. In order to fasten the glass fiber F on the lens flange 5, a further flange 6 with the fastening edges 61 is provided, which flange 6 holds the capillary 3 with the glass fiber F. As an alternative to a lens flange, it is possible to provide a precisely designed rigid guiding sleeve (ferrule) into which the fiber is plugged with the capillary. The guiding sleeve (ferrule) is worked very accurately on its outer side and is plugged into the lens flange 5 (fiber plug).

After the performance of active adjustment (including: setting the associated wavelength-selective filter and the beam offset arising therefrom) on a widened edge 51, the lens flange 5 is fastened on the housing 2 by means of laser welding in the direction of the arrow A. The flange 5 is actively adjusted in this case parallel to the housing surface.

After the performance of active adjustment with respect to the spherical lens 1, the fiber flange 6 is subsequently likewise fastened on the lens flange 5 via laser welding.

The housing 2 and parts of the flanges 5, 6 preferably consist of a weldable material such as, for example, structural steel, iron or Kovar in the vicinity of the spot welds or seams. The flanges are preferably designed in a cylindrical shape, and the contact surfaces between the platform and/or housing and the holding flanges and/or holding sleeves are ground flat in order to permit optimum adjustment and a low welding warpage.

The bevelling of the fiber end faces of the fiber F is taken into account in the design of the beam path and/or by a small lateral offset of the fiber axis with reference to the lens axis when adjusting these parts.

If an airtight and hermetically sealable mounting of the filter platforms is required, the light entry/exit ports 7 of the housing 2 are provided with optical windows which are preferably obliquely positioned and antireflection-coated, and which seal the ports 7 in an airtight fashion. Alternatively, the lens flange 5 is of airtight design and is welded tightly to the housing 2.

Figure 8A:
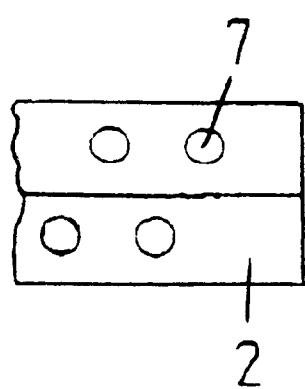
FIG. 8a shows an exemplary embodiment for the arrangement of the light entry/exit ports on a housing of a multiplexing/demultiplexing module according to the invention.

FIG. 8a shows a plan view of an exemplary embodiment for the arrangement of the light entry and light exit ports 7 on a housing 2, on which the lens and fiber flanges 5, 6 are fastened. The light entry and light exit ports 7 are arranged in this case offset relative to one another in level, something which permits the lens and fiber flanges 5, 6 to be fitted on the housing 2 in a simple and compact way, and is particularly easy to execute. In this exemplary embodiment, the mirrors or prisms in the housing interior have surfaces orientated in accordance with the offset of the light entry/exit ports 7.

Figure 8B:
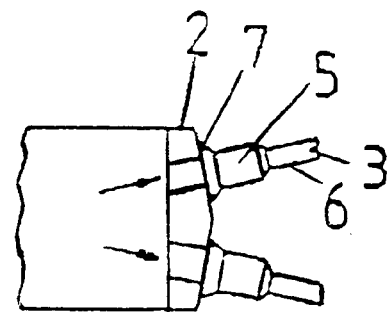
FIG. 8b shows an exemplary embodiment for the arrangement of fiber and lens holder flanges on a housing of a multiplexing/demultiplexing module according to the invention.
Figure 9:
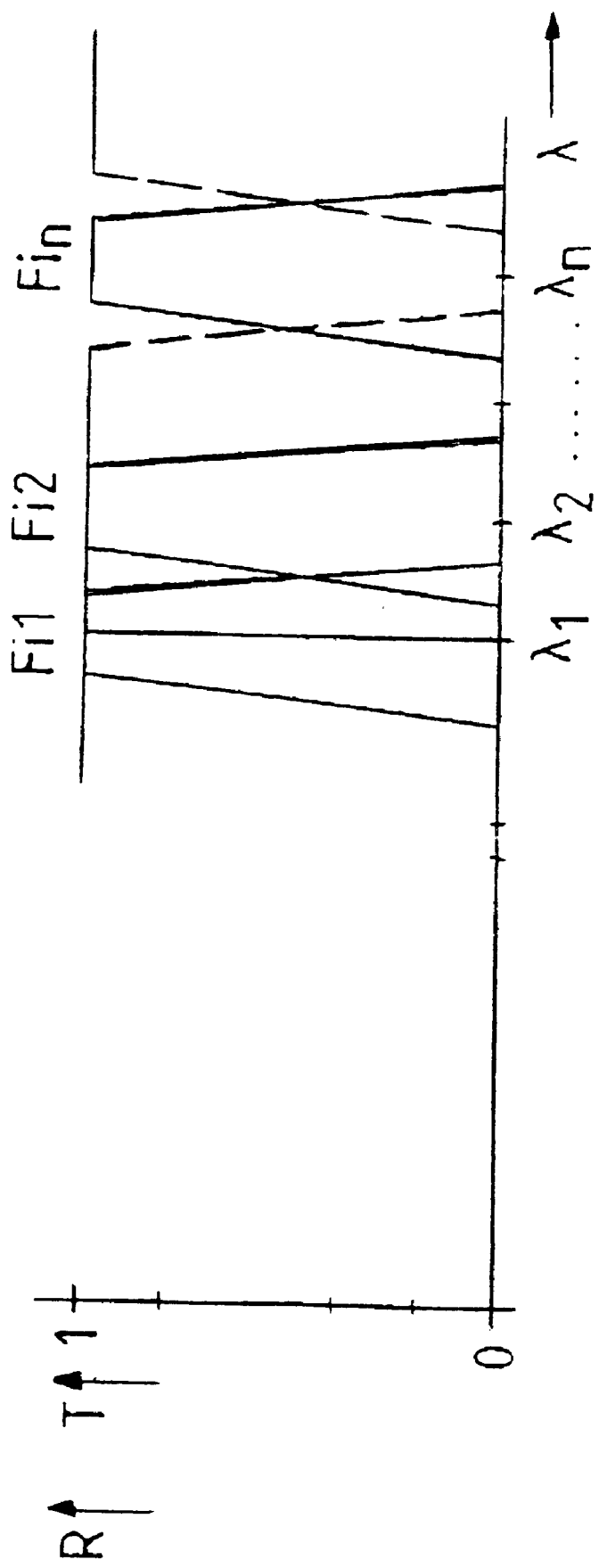
FIG. 9 shows a schematic of the transmissivity and reflectivity of optical filters of different center wavelengths, as a function of wavelength.
Figure 10:
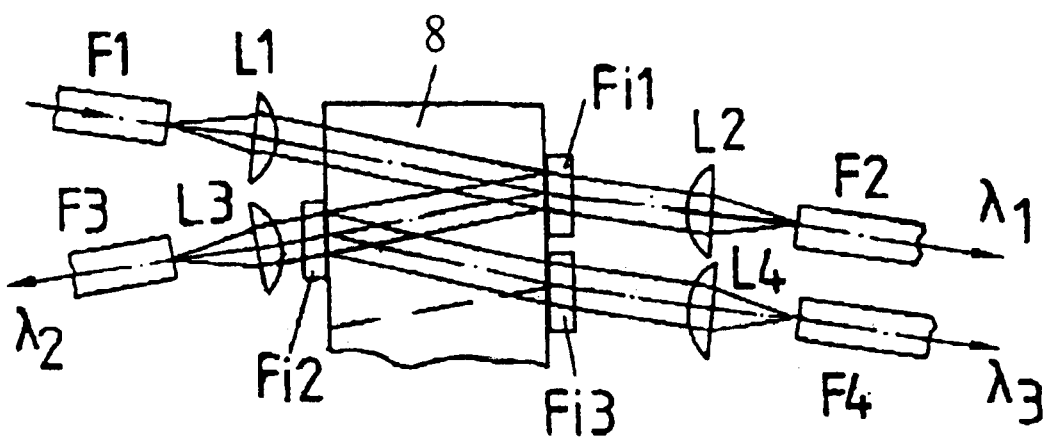
FIG. 10 shows an arrangement of the optical components of a wavelength multiplexer/demultiplexer having optical filters in accordance with the prior art.

FIG. 8b shows a further exemplary embodiment for the arrangement of the light entry and light exit ports 7 on a housing 2. The lens and fiber flanges 5, 6 are also illustrated here. In this case, the light entry and/or light exit ports 7 and/or the individual surfaces of the housing 2 in which these are located are fitted respectively at the same level, but tilted with respect to one another.

All the optical surfaces in the beam path for the module are antireflection-coated as far as possible, in order to keep insertion losses low. To suppress undesired reflection by the rear side of the filter, an alternative provides that in addition to an antireflection coating of this surface the filter substrate is designed approximately in the form of a wedge.

The invention is not limited to the exemplary embodiments explained above. It is essential for the invention only that at least one wavelength-selective filter can be set with reference to the angle of incidence of the light beams, such that the center wavelength of the filter can be set exactly and, moreover, the same filters can be used for multiplexing and/or demultiplexing light beams of different wavelengths.

We claim:

1. A module for multiplexing and/or demultiplexing optical signals, comprising:
    a first optical imaging system for performing a coupling operation selected from a group consisting of coupling in light of a plurality of optical channels from a given optical conductor and coupling out the light of the plurality of the optical channels to the given optical conductor;
    a second optical imaging system for performing a coupling operation selected from the group consisting of coupling in light from a plurality of optical conductors and coupling out light to the plurality of the optical conductors, each one of the plurality of the optical conductors for carrying the light of a respective one of the plurality of the optical channels;
    at least one wavelength-selective filter for performing an operation selected from the group consisting of multiplexing the light from the plurality of the optical conductors and demultiplexing the light from the given optical conductor;
    said wavelength-selective filter configured such that the light of at least one of the plurality of the optical channels strikes said wavelength-selective filter at a specific angle of incidence, said wavelength-selective filter performing an operation selected from the group consisting of separating the light of one of the plurality of the optical channels from the light of others of the plurality of the optical channels and combining the light of one of the optical channels with the light of others of the plurality of the optical channels;
    said wavelength-selective filter being adjustable with reference to the angle of incidence of the light of the one of the plurality of the optical channels; and
    at least one tiltably mounted optical element to be tilted with reference to an angle of incidence of a light beam for deflecting light reflected by one of said plurality of said filters toward one of said first optical imaging system, said second optical imaging system and a further wavelength-selective filter.

2. The module according to claim 1, comprising:
    a set of optical conductors that include the plurality of the optical conductors and the given optical conductor; and
    a plurality of imaging elements that include said first optical imaging system and said second optical imaging system;
    said at least one-wavelength selective filter including a plurality of filters;
    each one of said set of said optical conductors respectively assigned to at least one of said plurality of said imaging elements; and
    said one of said plurality of said imaging elements being located between the respectively assigned one of said set of said optical conductors and one of said plurality of said filters.

3. The module according to claim 2, wherein:
    said set of said optical conductors have optical axes and said plurality of said imaging elements have optical axes;
    said optical axes of said plurality of said imaging elements and said optical axes of said set of said optical conductors are arranged parallel to one another.

4. The module according to claim 3, wherein each one of said plurality of said imaging elements is a lens that is transirradiated off-axis by light of said assigned one of said set of said optical conductors.

5. The module according to claim 3, comprising:
    a plurality of lenses, each one of said plurality of said imaging elements being one of said plurality of lenses transirradiated axially by the light of said assigned one of said set of said optical conductors.

6. The module according to claim 5, wherein said tiltably mounted optical element is an element selected from the group consisting of a mirror and a prism that is disposed in a beam path between said filter and said one of said plurality of said lenses.

7. The module according to claim 1, comprising at least one cascade of tiltably mounted filters, said tiltably mounted filters being mounted for performing an operation selected from the group consisting of tilting individually and tilting in common.

8. The module according to claim 7, wherein:
    said at least one cascade of said tiltably mounted filters includes a first filter cascade and a second filter cascade;
    said first filter cascade includes a plurality of filters and said second filter cascade includes a plurality of filters;
    said at least one optical element forms at least one of said filter cascades; and
    said first filter cascade and said second filter cascade configured such that a beam path between said plurality of said filters of said first filter cascade and said plurality of said filters of said second filter cascade runs such that an optical path of light beams between said first filter cascade and said second filter cascade describes a zigzag line, and such that at least one beam of a specific wavelength is coupled out at each filter element from the beam path between said first filter cascade and said second filter cascade.

9. The module according to claim 7, comprising a mirror cascade defined by a cascade of tiltable mirror elements assigned to said cascade of said tiltably mounted filters; and
    at least one of said optical elements forms the mirror cascade.

10. The module according to claim 9, wherein:
said at least one cascade of tiltably mounted filters defines a filter cascade;
an optical path of light beams between said mirror cascade and said filter cascade describes a zigzag line; and
at least one light beam of a specific wavelength being coupled out at each one of said filters of said filter cascade from a beam path between said filter cascade and said mirror cascade.

11. The module according to claim 7, wherein said filters of said cascade respectively reflect light of a specific wavelength, said filters configured essentially in a row one behind another.

12. The module according to claim 11, comprising:
a tiltable mirror deflecting light reflected by said wavelength-selective filter and coupling the deflected light out into said filters of said cascade essentially at right angles to a beam direction; and
said at least of said optical elements forms said tiltable mirror.

13. The module according to claim 1, comprising a side at which all of said plurality of said optical channels are located.

14. The module according to claim 13, comprising a deflecting prism coupling the plurality of the optical channels with an optical imaging system selected from the group consisting of said first optical imaging system and said second optical imaging system.

15. The module according to claim 1, comprising:
a housing having at least one light entry/exit port; and
a flat platform inserted in said housing;
said filter disposed on said platform;
said first optical imaging system including at least one lens and at least one optical conductor;
said second optical imaging system including at least one lens and at least one optical conductors;
a lens and an optical conductor selected from the group consisting of said lens and said optical conductor of said first imaging system and said lens and said optical conductor of said second imaging system being permanently connected to said housing.

16. The module according to claim 15, comprising:
a lens holder permanently connected to said housing adjacent said light entry/exit port;
said first optical imaging system including lenses;
said second optical imaging system including lenses;
at least one lens selected from the group consisting of said lens of said first imaging system and said lens of said second imaging system being seated in said lens holder.

17. The module according to claim 16, comprising:
an optical fiber holder permanently connected to said lens holder; and
a capillary seated in said optical fiber holder;
said selected optical conductor including an optical fiber surrounded by said capillary and seated in said optical fiber holder;
said optical fiber holder selected from the group consisting of a fiber flange and a sleeve.

18. The module according to claim 17, wherein:
said housing is formed of a laser-weldable material adjacent said light entry/exit port;
said lens holder includes a surface in contact with said housing, said lens holder is formed of a laser-weldable material adjacent said surface in contact with said housing; and
said fiber holder includes a surface in contact with said lens holder, said fiber holder formed of a laser-weldable material adjacent said surface in contact with said lens holder.

19. The module according to claim 16, wherein said housing has a surface and said lens holder has a surface that is ground flat adjacent said light entry/exit ports.

20. The module according to claim 16, wherein said lens holder is a lens flange.

21. The module according to claim 15 wherein said filter has a flat surface that is directly mounted on said platform.

22. The module according to claim 15 comprising:
a support having at least one side that is flat;
said filter connected to said platform by said support.

23. The module according to claim 1, wherein said tiltably mounted optical element is at least one wavelength selective filter.

24. A module for multiplexing and/or demultiplexing optical signals, comprising:
a first optical imaging system for performing a coupling operation selected from a group consisting of coupling in light of a plurality of optical channels from a given optical conductor and coupling out the light of the plurality of the optical channels to the given optical conductor;
a second optical imaging system for performing a coupling operation selected from the group consisting of coupling in light from a plurality of optical conductors and coupling out light to the plurality of the optical conductors, each one of the plurality of the optical conductors for carrying the light of a respective one of the plurality of the optical channels;
at least one wavelength-selective filter for performing an operation selected from the group consisting of multiplexing the light from the plurality of the optical conductors and demultiplexing the light from the given optical conductor;
said wavelength-selective filter configured such that the light of at least one of the plurality of the optical channels strikes said wavelength-selective filter at a specific angle of incidence, said wavelength-selective filter performing an operation selected from the group consisting of separating the light of one of the plurality of the optical channels from the light of others of the plurality of the optical channels and
combining the light of one of the optical channels with the light of others of the plurality of the optical channels;
said wavelength-selective filter being adjustable with reference to the angle of incidence of the light of the one of the plurality of the optical channels;
at least one cascade of tiltably mounted filters, said tiltably mounted filters being mounted for performing an operation selected from the group consisting of tilting individually and tilting in common;
said at least one cascade of said tiltably mounted filters including a first filter cascade and a second filter cascade;
said first filter cascade including a plurality of filters and said second filter cascade including a plurality of filters; and
said first filter cascade and said second filter cascade configured to cause a beam path between said plurality of said filters of said first filter cascade and said plurality of said filters of said second filter cascade to run along an optical path of light beams between said first filter cascade and said second filter cascade describing a zigzag line, and to couple out at least one beam of a specific wavelength at each filter element from the beam path between said first filter cascade and said second filter cascade.

25. A module for multiplexing and/or demultiplexing optical signals, comprising;

a first optical imaging system for performing a coupling operation selected from a group consisting of coupling in light of a plurality of optical channels from a given optical conductor and coupling out the light of the plurality of the optical channels to the given optical conductor;

a second optical imaging system for performing a coupling operation selected from the group consisting of coupling in light from a plurality of optical conductors and coupling out light to the plurality of the optical conductors, each one of the plurality of the optical conductors for carrying the light of a respective one of the plurality of the optical channels;

at least one wavelength-selective filter for performing an operation selected from the group consisting of multiplexing the light from the plurality of the optical conductors and demultiplexing the light from the given optical conductor;

said wavelength-selective filter configured such that the light of at least one of the plurality of the optical channels strikes said wavelength-selective filter at a specific angle of incidence, said wavelength-selective filter performing an operation selected from the group consisting of separating the light of one of the plurality of the optical channels from the light of others of the plurality of the optical channels and combining the light of one of the optical channels with the light of others of the plurality of the optical channels;

said wavelength-selective filter being adjustable with reference to the angle of incidence of the light of the one of the plurality of the optical channels;

at least one cascade of tiltably mounted filters, said tiltably mounted filters being mounted for performing an operation selected from the group consisting of tilting individually and tilting in common;

a mirror cascade defined by a cascade of tiltable mirror elements assigned to said cascade of said tiltably mounted filters;

said at least one cascade of tiltably mounted filters defining a filter cascade;

an optical path of light beams between said mirror cascade and said filter cascade describing a zigzag line; and at least one light beam of a specific wavelength being coupled out at each one of said filters of said filter cascade from a beam path between said filter cascade and said mirror cascade.

26. A module for multiplexing and/or demultiplexing optical signals, comprising:

a first optical imaging system for performing a coupling operation selected from a group consisting of coupling in light of a plurality of optical channels from a given optical conductor and coupling out the light of the plurality of the optical channels to the given optical conductor;

a second optical imaging system for performing a coupling operation selected from the group consisting of coupling in light from a plurality of optical conductors and coupling out light to the plurality of the optical conductors, each one of the plurality of the optical conductors for carrying the light of a respective one of the plurality of the optical channels;

at least one wavelength-selective filter for performing an operation selected from the group consisting of multiplexing the light from the plurality of the optical conductors and demultiplexing the light from the given optical conductor;

said wavelength-selective filter configured such that the light of at least one of the plurality of the optical channels strikes said wavelength-selective filter at a specific angle of incidence, said wavelength-selective filter performing an operation selected from the group consisting of separating the light of one of the plurality of the optical channels from the light of others of the plurality of the optical channels and combining the light of one of the optical channels with the light of others of the plurality of the optical channels;

said wavelength-selective filter being adjustable with reference to the angle of incidence of the light of the one of the plurality of the optical channels;

at least one cascade of tiltably mounted filters, said tiltably mounted filters being mounted for performing an operation selected from the group consisting of tilting individually and tilting in common;

said filters of said cascade respectively reflecting light of a specific wavelength, said filters configured substantially in a row one behind another; and a tiltable mirror deflecting light reflected by said wavelength-selective filter and coupling the deflected light out into said filters of said cascade substantially at right angles to a beam direction.

27. A module for multiplexing and/or demultiplexing optical signals, comprising:

a first optical imaging system for performing a coupling operation selected from a group consisting of coupling in light of a plurality of optical channels from a given optical conductor and coupling out the light of the plurality of the optical channels to the given optical conductor;

a second optical imaging system for performing a coupling operation selected from the group consisting of coupling in light from a plurality of optical conductors and coupling out light to the plurality of the optical conductors, each one of the plurality of the optical conductors for carrying the light of a respective one of the plurality of the optical channels;

at least one wavelength-selective filter for performing an operation selected from the group consisting of multiplexing the light from the plurality of the optical conductors and demultiplexing the light from the given optical conductor;

said wavelength-selective filter configured such that the light of at least one of the plurality of the optical channels strikes said wavelength-selective filter at a specific angle of incidence, said wavelength-selective filter performing an operation selected from the group consisting of separating the light of one of the plurality of the optical channels from the light of others of the plurality of the optical channels and combining the light of one of the optical channels with the light of others of the plurality of the optical channels;

said wavelength-selective filter being adjustable with reference to the angle of incidence of the light of the one of the plurality of the optical channels;

a housing having at least one light entry/exit port;

a flat platform inserted in said housing;

said filter disposed on said platform;

said first optical imaging system including at least one lens and at least one optical conductor;

said second optical imaging system including at least one lens and at least one optical conductor; and a lens and an optical conductor selected from the group consisting of said lens and said optical conductor of said first imaging system and said lens and said optical conductor of said second imaging system being permanently connected to said housing.

28. The module according to claim 27, further comprising:

a lens holder permanently connected to said housing adjacent said light entry/exit port;

said first optical imaging system including lenses;

said second optical imaging system including lenses; and at least one lens selected from the group consisting of said lens of said first imaging system and said lens of said second imaging system being seated in said lens holder.

29. The module according to claim 28, further comprising:

an optical fiber holder permanently connected to said lens holder; and a capillary seated in said optical fiber holder;

said selected optical conductor including an optical fiber surrounded by said capillary and seated in said optical fiber holder;

said optical fiber holder selected from the group consisting of a fiber flange and a sleeve.

30. The module according to claim 29, wherein:

said housing is formed of a laser-weldable material adjacent said light entry/exit port;

said lens holder includes a surface in contact with said housing, said lens holder is formed of a laser-weldable material adjacent said surface in contact with said housing; and said fiber holder includes a surface in contact with said lens holder, said fiber holder formed of a laser-weldable material adjacent said surface in contact with said lens holder.

31. The module according to claim 28, wherein said housing has a surface and said lens holder has a surface ground flat adjacent said light entry/exit ports.

32. The module according to claim 28, wherein said lens holder is a lens flange.

33. The module according to claim 27, wherein said filter has a flat surface directly mounted on said platform.

34. The module according to claim 27, comprising:

a support having at least one flat side;

said filter connected to said platform by said support.

* * * * *